3,510,561
SULFONE-ENHANCED HEPARIN ABSORPTION THROUGH MUCOUS MEMBRANES
Teow Yan Koh, Toronto, Ontario, Canada, assignor to Canada Packers Limited, Toronto, Ontario, Canada
No Drawing. Continuation-in-part of applications Ser. No. 457,501 and Ser. No. 457,502, both filed May 20, 1965, Ser. No. 550,935, May 18, 1966, and Ser. No. 686,323, Nov. 28, 1967. This application Aug. 18, 1969, Ser. No. 851,102

Int. Cl. A61k 17/18

U.S. Cl. 424—183     26 Claims

ABSTRACT OF THE DISCLOSURE

This invention relates to sulfone-enhanced heparin absorption through mucous membranes and particularly to compositions and methods for administering heparin so that it is absorbed through the mucous membranes to provide effective anticoagulant activity. The compositions contain heparin and at least one non-toxic physiologically acceptable sulfone, such as a dialkyl sulfone, a sulfolane or sulfolene. It has been discovered that these sulfones promote the absorption of the heparin anticoagulant substance through the mucous membranes. The compositions may also contain a fatty alcohol of chain length $C_{14}$ to $C_{24}$ to prolong or regulate the time period of absorption of the active anticoagulant substance from the composition. The composition may be administered in the form of solids or liquids which may be incorporated in enteric-coated tablets or capsules for oral administration.

---

The present application is a continuation-in-part of my applications Ser. Nos. 457,501 and 457,502, filed May 20, 1965, now abandoned, my application Ser. No. 550,935 filed May 18, 1966 now abandoned and my application Ser. No. 686,323 filed Nov. 28, 1967.

BACKGROUND AND DEFINITIONS

The invention relates to heparin compositions and methods of administration.

The word "heparin" as used in the present application refers to the readily water soluble forms of the natural sulfated polysaccharides composed of alternating hexosamine and hexuronic residues including the non-toxic water soluble salts and water soluble derivatives thereof. While the invention is exemplified with the sodium salt, it is understood that other water soluble heparin compounds known to the art, including other alkali metal salts as well as organic salts, such as choline heparinate and procaine heparinate may be used. See for example, U.S. Pat. No. 3,062,716 granted Nov. 6, 1962, for a disclosure of various heparin salts.

Heparin has a long established reputation as a safe and effective anticoagulant. Its use, however, has been limited by the need to administer it parenterally, since it is inactive or only slightly active per se by routes other than parenteral, for example by the oral route. (See, for example, the article by Windsor et al. entitled "An investigation of Routes of Administration of Heparin Other Than Injection" in American Journal of Medicine, vol. 37, September 1964, pages 408–416, wherein sublingual, buccal, rectal and pulmonary routes using tablets, solutions, suppositories and aerosols were reported.) Injections have been characterized by a quick response to provide a high level of systemic anticoagulant activity which then declines at a rapid rate. Therefore, repeated intravenous injections or large subcutaneous injections are required where it is desired to maintain a therapeutic level of anticoagulant activity in the blood. Such repeated injections are both inconvenient and painful.

THE INVENTION

The invention in its broad aspect resides in the discovery that certain sulfones enhance or promote the absorption of heparin through the mucous membranes, such as the sublingual regions of the mouth and the walls of the intestinal tract. By combining heparin with the sulfone, the use of this highly regarded anticoagulant substance is extended to oral administration and to administration to other mucous membranes. See U.S. Pat. No. 3,062,716 granted Nov. 6, 1962 for administration of heparin rectally and U.S. Pat. No. 3,232,833, granted Feb. 1, 1966, for administration of heparin to the mucous membranes of the eye, ear, nose and throat.

The expression "oral administration" as used herein, means administration by mouth and includes introduction of the therapeutic compositions of the invention into the sublingual or buccal regions for absorption therefrom, as well as the administration in the form of enteric-coated tablets or capsules for swallowing and subsequent release of the heparin in the intestine for absorption through the intestinal walls.

Use of the invention is in the fields for which heparin therapy has already been established and may be in the veterinary field for the therapeutic treatment of animals.

The invention, in a further aspect, resides in the discovery that certain saturated and unsaturated fatty alcohols and mixtures thereof, preferably of chain length $C_{14}$ to $C_{24}$, when administered simultaneously with heparin and a sulfone, improve and sustain the effectiveness of the anticoagulant activity. This represents a substantial advantage in anticoagulant therapy, where a sustained action is very desirable. Repeat dosages may be administered at longer time intervals and a more uniform response attained.

An object of the invention is to provide a heparin composition which is effective when administered to the mucous membranes, including administration by the oral route.

Another object is to provide an improved heparin composition from which the anticoagulant activity is absorbable into the blood stream from the intestinal tract.

Another object of the invention is to provide a heparin composition from which the anticoagulant activity is absorbable from the intestinal tract over a sustained period of time.

Another object of the invention is to provide a heparin composition which may be administered orally and from which the anticoagulant activity can be slowly but continuously absorbed through the mucous membranes.

A still further object of the invention is the provision of orally effective heparin compositions which are easy to encapsulate.

Suitable sulfones for the purposes of this invention are the non-toxic, pharmaceutically-acceptable sulfones which are substantially devoid of undesirable physiological activity. Reference is made to U.S. Pat. No. 3,098,793, granted July 23, 1963, describing the known utility of certain sulfones as pharmaceutical solvents for a wide variety of difficultly soluble medicinal agents.

Examples of the sulfones which enhance the absorption of heparin through mucous membranes are those of the formula

wherein $R_1$ and $R_2$ are alkyl, alkylene, aralkyl, or together form with the sulfur atom a saturated or unsaturated five or six membered ring such as in sulfolane and sulfolene. $R_1$ and $R_2$ may be the same or may be different.

Specific examples are the di-alkyl sulfones having the formula:

(I) 

wherein $R_1$ and $R_2$ are alkyl or aralkyl (e.g. benzyl) groups having up to 12 carbon atoms.

Examples of ring compounds are sulfolane (tetrahydrothiophene 1,1-dioxide) having the formula:

(II) 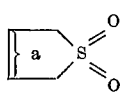

(wherein $a$ is a single bond), sulfolene (wherein $a$ of Formula II. is a double bond), and their homologues and close analogues, e.g. wherein one or more of the hydrogen atoms may be substituted by hydrocarbon radicals as described in U.S. Pat. No. 2,360,861.

The fatty alcohols of chain length $C_{14}$ to $C_{24}$ are exemplified by cetyl alcohol ($C_{16}$), stearyl alcohol ($C_{18}$), oleyl alcohol ($C_{18}$), arachidyl alcohol ($C_{20}$), behenyl alcohol ($C_{22}$) and mixtures thereof which are obtainable, for example, by reduction of corresponding fatty acids. The fatty acids themselves are ineffective. The fatty alcohols of the chain length specified may either be saturated or unsaturated, e.g. oleyl alcohol. They possess good emulsifying properties. Further, it has been found that in general, the longer the chain length of the fatty alcohol, the better the degree of enhancement of the heparin composition with respect to sustained time of absorption of the anticoagulant activity.

The mechanism of the action of the sulfones is unknown, but it is thought that they affect the porosity of the mucous membranes, e.g. the intestinal or sublingual mucosa, thereby permitting the absorption of heparin from the composition does not depend upon solubility characteristics either of the heparin in the enhancing agent or of the enhancing agent in water. Heparin sodium, the commercial form of heparin, is very soluble in water but cannot be absorbed from water solutions through the intestinal walls. On the other hand, heparin sodium is not soluble in the sulfones but is absorbable from a composition containing a sulfone.

The composition may be in the form of a solution or suspension or solid admixture of the ingredients depending upon the solubility and melting characteristics of the selected sulfones. The presence of water is not critical and may be added if desired for convenience. It is primarily used as a diluent, as a dispersing medium, and to control dosages. In general, the amount of sulfone present in the composition is the minimum that will provide the desired adsorption-enhancing effect upon the heparin. Where a $C_{14}$ to $C_{24}$ fatty alcohol is used in addition to the sulfone, the amount is usually at least equal on a weight basis to the heparin component. Functionally, it may be expressed as that amount which will enhance and/or prolong the anticoagulant adsorption from the heparin-sulfone compositions.

The composition may be compounds in a number of ways. The two or three components, as the case may be, may be simply mixed together with or without the addition of water. A convenient preparation, where the fatty alcohol is used, is in the form of an emulsion. Thus, the fatty alcohol may be thoroughly dispersed in the sulfone, the heparin or a water solution thereof added and the resulting material mixed until a uniform emulsion is formed.

In anticoagulant therapy, the desired therapeutic dosage is the amount of heparin which is sufficient to double blood clotting time. The therapeutic dosage for the compositions of the invention is readily determined by those skilled in the art. For example, sufficient of the composition is administered orally in one or more tablets or capsules to double the blood clotting time as determined on a sample of withdrawn blood of the particular species of mammal undergoing treatment. If the therapeutic level is to be maintained the dosage is repeated at intervals as deemed necessary.

Representative therapeutic dosages may contain, for example, 50 to 100 mg. of heparin having an activity of 100 anticoagulant $\mu$/mg., and from about 0.5–10 grams of the selected sulfone per 100 mg. of heparin. From 0.1 to 2 grams of fatty alcohol may be included. If water is included in the composition, the amount can vary over wide limits, e.g. from 0 to 90%.

The total daily unit of heparin for a mammal, such as a dog, may, for example, be from 50–1000 mg. (based on heparin having an activity of 100 $\mu$/mg.) in combination with from 0.5 to 10 grams of the sulfone and, if desired, from 0.1 to 10 grams of the fatty alcohol. Because of the well-known instability of heparin in acids, standard enteric encapsulation procedure as set forth, for example, in Remington's Practice of Pharmacy, or in U.S. Pat. No. 3,126,320, granted Mar. 24, 1964, e.g. with cellulose acetate phthalate, or the like, is used to provide an enteric capsule which when swallowed will survive the acid medium of the stomach and will be dissolved in the alkaline medium of the intestine. As an example of this mode of administration, the dosage unit sufficient to double blood clotting time is given in the form of one or more enteric-coated gelatin capsules. The invention is further illustrated by the following examples of practice.

EXAMPLE I 25 grams of diethyl sulfone (M.P. 73° C.) were dissolved in 100 ml. of water to provide a 25 g. percent solution which was adjusted by NaOH addition to a pH 7.4. 100 mg. of heparin was then dissolved in 4 ml. of this solution. The resulting solution can be administered by injection or to mucous membranes by known routes or may be encapsulated for oral administration. For the latter, the amount of water can be decreased or omitted entirely.

EXAMPLE II (a) 25 grams of n-propylsulfone (M.P. 28–29° C.) is mixed with 50 ml. of water and adjusted to pH 7.4 as in Example I. From 2 to 4 ml. of the resulting suspension is mixed with 100 mg. of heparin.

(b) For encapsulation, the water in (a) may be omitted. Thus, 100 mg. of heparin are mixed with about 2 grams of substantially neutral di-n-propyl sulfone warmed to liquid form. The resulting suspension is cooled to solid form, pressed into a tablet or encapsulated in gelatin, following which the capsules are given a standard enteric coating, for example, with cellulose acetate phthalate.

EXAMPLE III

To 4 ml. of an aqueous n-propyl sulfone solution prepared as in Example II, is added 200 mg. of a water soluble heparin derivative made by treating heparin sodium with 0.15 N HCl in methanol to provide a partially methylated and desulfated heparin assaying 70 U.S.P. anticoagulant $\mu$/mg.

EXAMPLE IV 100 mg. of heparin is mixed with 4 ml. of a solution of 25 ml. of sulfolane in 25 ml. of water. This composition can be administered in the manner described in Example I.

EXAMPLE V 100 mg. of heparin is dissolved in a solution prepared by dissolving 25 grams of sulfolene (2,5-dihydrothiophene 1,1-dioxide) in 100 ml. of water. The product may be administered as previously described.

EXAMPLE VI

The compositions of Example I to V are prepared without the use of water, the proportions of sulfone to heparin remaining approximately the same. These compositions are eminently suited for oral administration. They are formed into powders or tablet for administration by the buccal route or encapsulated and/or enteric coated for administration by swallowing and intestinal absorption.

In a similar manner, heparin compositions are produced by the procedures of Examples I–VI using substituted compounds of the formula $R_1R_2SO_2$ in lieu of diethyl and di-n-propyl sulfone, sulfolane and sulfolene. Mixtures of the sulfones can be employed beneficially in lieu of a single sulfone. Thus, for example, sulfolane and n-propyl sulfone can be used together to enhance the absorption of heparin.

EXAMPLE VII 0.5 ml. of oleyl alcohol, 1.0 ml. of n-propyl sulfone and 100 mg. of heparin are mixed together until an emulsion is formed. The heparin may be added in solution in e.g. 0.5 ml. of $H_2O$ if desired.

In a similar manner, mixtures containing heparin or a heparinoid, oleyl alcohol, cetyl alcohol, stearyl alcohol, behenyl alcohol or arachidyl alcohol and di-methyl sulfone, diethyl sulfone, di-n-butyl sulfone, sulfolane or sulfolene are produced.

EXAMPLE VIII 200 mg. of arachidyl alcohol are ground with 1.0 ml. of n-propyl sulfone until a homogeneous mass is produced. 200 mg. of a heparin derivative (prepared by treatment of heparin sodium with 0.15 N HCl in methanol to provide a water soluble partially methylated and desulfated heparin derivative assaying 70 U.S.P. anticoagulant $\mu$/mg.) are added to the alcohol-sulfone mixture and the mass is stirred until a uniform emulsion is produced.

In a similar manner, compositions are produced using the other alcohols in lieu of arachidyl alcohol and/or the other sulfones in lieu of n-propyl sulfone. The heparin derivative may be added to the composition either as a solid or in the form of an aqueous solution, e.g. 200 mg. of the heparin derivative readily dissolves in 0.5 ml. of water, the resulting solution may be incorporated in the alcohol-sulfone mixture.

EXAMPLE IX

Effect of Oral Administration of Enteric-Coated Capsules of Heparin-Sulfone-Fatty Alcohol in Dogs A batch of enteric-coated capsules, each containing 100 mg. sodium heparinate (159 U.S.P. anticoagulant $\mu$/mg.), 1.0 ml. di-n-propyl sulfone and 0.5 ml. oleyl alcohol was prepared.

Three capsules were fed to a fasted, male dog weighing 11 kg. Blood samples were taken at time intervals after feeding the capsules and the clotting time determined.

| Test | Hours After Feeding of Capsules | | | | |
|---|---|---|---|---|---|
| | 0 | 2½ | 3 | 5 | 7 |
| Blood Clotting Time | 5'20" | 6'02" | 12'42" | 11'21" | 6'12" |

Following a lag period of 3 hours, the blood clotting time was elevated to 12'42". By the 6th hour, twice the normal blood clotting time was still maintained. Prolonged blood clotting time at the therapeutic level was, therefore, detected for 3 hours.

The effect of the sulfones and fatty alcohols upon the absorption of heparin through the intestinal wall is further illustrated by the following experiments on test animals. Two methods were employed as follows:

(A) Intestinal Loop In Situ

Rabbits, of either sex, weighing approximately 3 kg. were used. Under ether anaesthesia, the abdomen was entered through a mid-line incision. A suitable loop of the mid-gut, measuring about 6", was exposed and transected, leaving the mesenteric blood supply intact. The loop was then irrigated with aqueous sulfone solution or suspension (ph 7.4) with which the heparin or heparinoid was to be instilled. The distal end was then ligated. The heparin in an aqueous solution or dispersion of the selected sulfone was instilled into the loop and the proximal end ligated. The closed loop was then replaced in the abdominal cavity.

Blood samples (10 ml.) were taken by cardiac puncture at intervals after instillation and the clotting time determined by the method of Mayer, G. A., J. Lab. Clin. Med., 49, 938 (1957).

(B) Intact in Vivo Intestine

Ether-anaesthetized rabbits were used. The abdomen was entered through a mid-line incision and the Ligament of Treitz identified. Aqueous heparin-sulfone solutions or dispersions, with added fatty alcohol in some instances, were injected directly into the jejunum.

Clotting time of blood samples, taken at intervals after injection, was determined as previously described.

The test results are set forth below:

(1) Absorption of heparin in the rabbit intestinal loop in situ (sulfolane)

Sulfolane enhanced the absorption of heparin in the intestinal loop in situ. The data which demonstrate the appearance of heparin in the blood stream as evidenced by the prolonged blood clotting time, are recorded in Table I.

TABLE I.—SYSTEMIC ANTICOAGULANT ACTIVITY

| Rabbit No. | Instillate* | | Clotting time Hours After Instillation | | | |
|---|---|---|---|---|---|---|
| | Heparin, mg. | Sulfolane, ml. | 0** | 2½ | 5 | 6½ |
| 1 | 100 | 4 | 8'45" | >180' | 40'00" | |
| 2 | 100 | 4 | 8'45"±43" | >240' | | 13'00" |
| 3 | | 4 | 8'45"±43" | 8'30" | 8'45" | |
| 4 | 100 | | 8'45"±43" | 8'55" | 9'13" | |
| 5 | 100 | | 8'45"±43" | 5'38" | | |

*Heparin, 151 U.S.P. anticoagulant $\mu$/mg. Sulfonate, 50% aqueous solution.
**Mean and S.D. of 20 rabbits.

The data presented in Table I show that a single dose of a 4 ml. 50% aqueous sulfolane solution of 100 mg. heparin to the intestinal loop resulted in at least 25 fold increase in clotting time. This effect took place 2½ hours after installation. The systemic anticoagulant activity then fell and almost completely disappeared by 6½ hours after instillation.

Neither sulfolane nor heparin alone produced any anticoagulation.

(2) Absorption of heparin in the intact intestine (sulfolane)

Sulfolane enhanced the absorption of heparin in the intact intestine. Therapeutically effective blood levels of heparin (twice the normal blood clotting time) were produced when 6 ml. 50% aqueous sulfolane solution of 100 mg. heparin was placed in the intact intestine. The data are presented in Table II. The effect was immediate.

TABLE II.—SYSTEMIC ANTICOAGULANT ACTIVITY

| Rabbit No.: | Material Injected* | | Clotting Time Hours After Injection | | |
|---|---|---|---|---|---|
| | Heparin, mg. | Sulfolane, ml. | 0** | 1 | 2½ |
| 6 | 100 | 6 | 8'45"±43" | 25'00" | 13'40" |
| 7 | 100 | 6 | 8'45"±43" | 28'00" | 21'12" |
| 8 | 100 | 6 | 8'45"±43" | 29'36" | |
| 9 | | 6 | 8'45"±43" | 10'38" | |
| 10 | 100 | | 8'45"±43" | 8'50" | 9'04" |

* Heparin, 151 U.S.P. anticoagulant μ./mg. Sulfonate, 50% aqueous solution.
** Mean and S.D. of 20 rabbits.

An intravenous injection of aqueous sulfolane did not produce any anticoagulation (data not included in Table II), i.e. sulfolane had no anticoagulant activity. The control experiment using sulfolane alone (rabbit 9) also did not produce systemic anticoagulant activity. This would indicate that sulfolane did not cause release of endogenous heparin into the blood. Heparin alone failed to be absorbed (rabbit 10).

(3) Absorption of heparin from heparin-n-propyl sulfone in the rabbit intestinal loop in situ n-Propyl sulfone enhanced the absorption of heparin in the isolated rabbit intestinal loop. The data presented in Table III demonstrate that a significant amount of heparin was absorbed from the intestine into the blood, raising its clotting time to above 180'.

The control experiment, using n-propyl sulfone alone, produced no anticoagulation. Previous work had shown that heparin alone was not absorbed.

Gross examination at sacrifice of the animals showed no damage to the mucosa.

TABLE III.—SYSTEMIC ANTICOAGULANT ACTIVITY AFTER INSTILLATION OF HEPARIN AND n-PROPYL SULFONE INTO ISOLATED JEJUNAL LOOP IN SITU

| Rabbit No. | Instillate * | | Clotting Time Hours After Instillation | | |
|---|---|---|---|---|---|
| | Heparin, mg. | n-Propyl Sulfone, ml. | 0** | 1 | 5 |
| 1 | 100 | 4 | 8'45"±43" | >90' | |
| 2 | 100 | 4 | 8'45"±43" | >180' | 13'35" |
| 3 | | 4 | 8'45"±43" | 9'05" | 8'52" |

* Heparin, 151 U.S.P. anticoagulant μ./mg. n-Propyl Sulfone, 50 g. percent suspension.
** Mean and S.D. of 20 rabbits.

(4) Absorption of heparin from heparin-n-propyl sulfone in the intact rabbit intestine n-Propyl sulfone enhanced the absorption of heparin and of a heparin derivative in the intact rabbit intestine. The data are presented in Table IV. Heparin accumulated in the blood to therapeutically effective level (twice the normal blood clotting) within an hour after administration. The systemic anticoagulant activity then fell, with the blood clotting time returning to the normal value 4 hours after administration.

TABLE IV.—SYSTEMIC ANTICOAGULANT ACTIVITY AFTER INTRA-JEJUNUM ADMINISTRATION OF HEPARIN OR DERIVATIVE AND n-PROPYL SULFONE

| Rabbit No. | Injecta* | | Clotting Time Hours After Injection | | | | |
|---|---|---|---|---|---|---|---|
| | Heparin, mg. | n-Propyl Sulfone, ml. | **0 | 1 | 2 | 3 | 3½ |
| 1 | 100 | 4 | 8'45"±43" | 32'50" | | | 16'05" |
| 2 | 100 | 4 | 8'45"±43" | 28'35" | | | 13'15" |
| 3 | 100 | 3 | 8'45"±43" | 29'53" | | | 10'20" |
| 4 | 100 | 2 | 8'45"±43" | 26'49" | | | 9'20" |
| 5 | 100 | 2 | 8'45"±43" | 22'10" | | | 9'29" |
| 6 | | 4 | 8'45"±43" | 8'49" | | | 8'42" |
| 7 | | 4 | 8'45"±43" | 9'10" | | | 8'50" |
| | Heparin derivative mg. | n-Propyl Sulfone, ml. | | | | | |
| 8 | 200 | 4 | 8'45'±43" | 4'45" | 14'30" | >60' | |
| 9 | 200 | 4 | 8'45"±43" | | 15'30" | 53'20" | |
| 10 | 200 | | 8'45"±43" | | 8'00" | 7'45" | |

* Heparin, 155 U.S.P. anticoagulant μ./mg. Heparin derivative, Partially methylated and desulfated heparin assaying at 70 U.S.P. anticoagulant μ./mg. n-Propyl Sulfone, 50 g. percent suspension (pH 7.4).
** Mean and S.D. of 20 rabbits.

Intravenous n-propyl sulfone produced no anticoagulation indicating it had no anticoagulant activity. The control experiment using n-propyl sulfone alone also did not produce any anticoagulation. This would indicate that n-propyl sulfone did not cause the release of endogenous heparin into the blood.

It will be seen from Tables II and IV that 2–4 ml. of 50 g. percent aqueous suspension of n-propyl sulfone with 100 mg. of heparin provided a response in the intact intestine substantially equivalent to 6 ml. of 50% aqueous sulfolane with 100 mg. of heparin and that the response after 3½ hours was substantially as great for the n-propyl sulfone as that obtained after 2½ hours with the sulfolane. Both materials are useful absorption enhancing agents. A single intra-jejunal dose of 2 ml. 50 g. percent suspension of n-propyl sulfone and 100 mg. of heparin trebled the blood clotting time after one hour.

A single intra-jejunal dose of 4 ml. 50 g. percent suspension of n-propyl sulfone and 200 mg. of the heparin derivative almost doubled the blood clotting time in two hours and after three hours raised it approximately sevenfold. More prolonged activity is obtained by use of the heparinoid as compared to heparin.

Intraperitoneal injection of 2 ml. 50 g. percent aqueous suspension of n-propyl sulfone produce no toxic symptoms in the rabbit.

(5) Absorption of heparin in the rabbit intestinal loop in situ (sulfolene)

An instillate of 100 mg. of heparin in 4 ml. 25 g. percent sulfolene to the ligated loop of the living anaesthetized rabbit raised the whole blood clotting time from a normal value of 8 minutes 45 seconds to a value exceeding 180 minutes, within an hour after introduction of the instillate. Significantly increased blood clotting time could be maintained for approximately four hours. A control experiment in which sulfolene alone was used did not produce any anticoagulation. The results are shown in the following table.

TABLE V.—SYSTEMIC ANTICOAGULANT ACTIVITY AFTER ADMINISTRATION OF HEPARIN AND SULFOLENE INTO ISOLATED JEJUNAL LOOP IN SITU

| Rabbit No. | Instillate * | | Clotting Time Hours after Instillation | | | |
|---|---|---|---|---|---|---|
| | Heparin, mg. | Sulfolene, ml. | 0** | 1 | 2½ | 4½ |
| 1 | 100 | 4 | 8'45"±43" | >90' | >30' | |
| 2 | 100 | 4 | 8'45"±43" | >180' | | >60' |
| 3 | 100 | 4 | 8'45"±43" | >180' | >45' | |
| 4 | | 4 | 8'45"±43" | 9'10" | | 8'48" |

* Heparin, 155 U.S.P. anticoagulant μ./mg. Sulfolene, 25 g. percent solution.
** Mean and S.D. of 20 rabbits.

Sulfolene has no observable toxic qualities regardless of the route of administration.

(6) Systemic anticoagulant activity after administration of heparin and diethyl sulfone to the isolated jejunal loop in situ An instillate of 100 mg. of heparin in 4 mil. of 25 g. percent diethyl sulfone to the ligated loop of the living anaesthetized rabbit raised the whole blood clotting time to a value exceeding 180 minutes within an hour after introduction of the instillate. The clotting time was still about treble normal clotting time after 5 hours. The results shown in the following table.

TABLE VI.—SYSTEMIC ANTICOAGULANT ACTIVITY AFTER ADMINISTRATION OF HEPARIN AND DIETHYL SULFONE TO THE ISOLATED JEJUNAL LOOP IN SITU

| Rabbit No. | Instillate * Heparin, mg. Diethyl Sulfone, ml. | Clotting Time Hours after Instillation | | |
|---|---|---|---|---|
| | | 0 ** | 1 | 5 |
| 1 | 100  4.0 | 8'45"+43" | >180' | 24'40" |
| 2 | 100  4.0 | 8'45"+43" | >160' | >30' |
| 3 | 4.0 | 8'45"+43" | 8'43" | 8'22" |

* Heparin, 155 U.S.P. anticoagulant μ./mg. Diethyl Sulfone, 25 g. percent solution, pH 7.4.
** Mean and S.D. of 20 rabbits.

(7) Systemic anticoagulant activity after administration of heparin and diethyl sulfone to the intact intestine In the intact intestine the blood clotting time was significantly increased by the administration of 100 mg. of heparin in 8 ml. of a 25 g. percent solution of diethyl sulfone. The results are shown in the following table.

TABLE VII.—SYSTEMIC ANTICOAGULANT ACTIVITY AFTER ADMINISTRATION OF HEPARIN AND DIETHYL SULFONE TO THE INTACT INTESTINE

| Rabbit No. | Injecta * Heparin, mg. Diethyl Sulfone, ml. | Clotting Time Hours after Injection | | |
|---|---|---|---|---|
| | | 0 ** | ¾ | 2½ 5 |
| 1 | 100  8.0 | 8'45"+43" | 8'43" | 14'30"  7'10" |
| 2 | 8.0 | 8'45"+43" | 10'05" | 8'47" |

* Heparin, 155 U.S.P. anticoagulant μ./mg. Diethyl Sulfone, 25 g. percent solution, pH 7.4.
** Mean and S.D. of 20 rabbits.

(8) Heparin-n-propyl sulfone-stearyl alchol

The systemic anticoagulant activities of 4 rabbits, as measured by the blood clotting time, after intra-jejunum administration of heparin and n-propyl sulfone with and without stearyl alcohol, are presented in Table VIII. 100 mg. heparin and 2 ml. n-propyl sulfone in the absence of TABLE VIII.—SYSTEMIC ANTICOAGULANT ACTIVITY AFTER INTRA-JEJUNUM ADMINISTRATION OF HEPARIN, n-PROPYL SULFONE AND STEARYL ALCOHOL

| Rabbit No. | Injecta | | | Clotting Time Hours After Injection | | | | |
|---|---|---|---|---|---|---|---|---|
| | Heparin*, mg. | n-Propyl Sulfone, ml. | Stearyl Alcohol, mg. | 0 ** | 1 | 3½ | 6 | 22 |
| 101 | 100 | 2.0 | 300 | 8'45"±43" | 54'13" | | 25'38" | 11'54" |
| 102 | 100 | 2.0 | 300 | 8'45"±43" | 35'45" | | 48" | 9'21" |
| 103 | 100 | 2.0 | | 8'45"±43" | 32'50" | 16'05" | | |
| 104 | 100 | 2.0 | | 8'45"±43" | 28'35" | 13'15" | | |

* Heparin, 155 U.S.P. anticoagulant μ./mg.
** Mean and S.D. of 20 rabbits.

stearyl alcohol resulted in heparin absorption so that the clotting time was raised approximately four-fold, within 1 hour after administration. Following this, the systemic anticoagulant activity dropped abruptly with time. At 3½ hours after injection, the blood clotting time was reduced to approximately 14'. The therapeutically effective level of blood heparin (twice the normal blood clotting time) was found to be maintained for approximately 2½ hours.

When 300 mg. stearyl alcohol was added to the heparin-n-propyl sulfone composition, better absorption of heparin occurred. The blood clotting time was raised approximately six-fold. Furthermore, the maintenance of therapeutically effective level of blood heparin was found to be of the order of approximately 16 hours.

(9) Heparin-n-propyl sulfone-arachidy alcohol

The appearance of systemic anticoagulant activities of 3 rabbits, as evidenced by the increased blood clotting time, after intra-jejunum administration of heparin and n-propyl sulfone with and without arachidyl alcohol are recorded in Table IX.

TABLE IX.—SYSTEMIC ANTICOAGULANT ACTIVITY AFTER INTRA-JEJUNUM ADMINISTRATION OF HEPARIN, n-PROPYL SULFONE AND ARACHIDYL ALCOHOL

| Rabbit No. | Injecta | | | Clotting Time Hours After Injection | | | |
|---|---|---|---|---|---|---|---|
| | Heparin*, mg. | n-Propyl Sulfone, ml. | Arachidyl Alcohol, mg. | 0** | 1 | 3½  4½ | 6 |
| 105 | 100 | 1.0 | 200 | 8'45"±43" | 63'32" | 28'23" | 19'45" |
| 106 | 100 | 1.0 | | 8'45"±43" | 26'49" | 9'20" | |
| 107 | 100 | 1.0 | | 8'45"±43" | 22'10" | 9'29" | |

*Heparin, 155 U.S.P. anticoagulant μ./mg.
**Mean and S.D. of 20 rabbits.

That data in Table IX indicate that 100 mg. heparin and 1.0 ml. n-propyl sulfone administered intra-jejunally to the rabbit raised the blood clotting time approximately three-fold, within 1 hour after administration. It was found that the maintenance of therapeutically effective level of blood heparin was of the duration of approximately 2 hours.

With the addition of 200 mg. arachidyl alcohol, the absorption of heparin was improved. The blood clotting time was raised to 7 times above normal. The maintenance of therapeutically effective level of blood heparin was also prolonged. It was maintained for a period of at least 6 hours.

(10) Heparin-n-propyl sulfone-behenyl alcohol

The rabbits' responses, in terms of blood clotting time, after intra-jejunum injection of heparin, n-propyl sulfone and behenyl alcohol are recorded in Table X.

TABLE X.—SYSTEMIC ANTICOAGULANT ACTIVITY AFTER INTRA-JEJUNUM ADMINISTRATION OF HEPARIN, BEHENYL ALCOHOL AND n-PROPYL SULFONE

| Rabbit No. | Injecta | | | Clotting Time, Hours after Injection | | | | | | |
|---|---|---|---|---|---|---|---|---|---|---|
| | Heparin, mg. | Behenyl lcohol, mg. | n-Propyl Sulfone, ml. | **0 | 1 | 3 | 4 | 6 | 17 | 22 |
| 108 | 100 | 200 | 2.0 | 8'45"±43" | >315' | | | 8'10" | | |
| 109 | 100 | 200 | 2.0 | 8'45"±43" | ¹162' | | 14'03" | 13'51" | | |
| 110 | 100 | 200 | 1.0 | 8'45"±43" | 16'30" | | | | 11'35" | |
| 111 | 100 | 200 | 1.0 | 8'45"±43" | | 54'30" | | | | 8'10" |
| 112 | 100 | 200 | 1.0 | 8'45"±43" | | | | 12'40" | | |
| 113 | 100 | 200 | 1.0 | 8'45"±43" | | | | | 10'47" | |

¹ Approximate.
* Heparin, 155 U.S.P. anticoagulant μ./mg.
** Mean and S.D. of 20 rabbits.

If the data (rabbits 110–113) of Table X are compared to the data for the heparin-sulfone alone (rabbits 106, 107) of Table IX, it is noted that behenyl alcohol greatly enhanced the adjuvant action of n-propyl sulfone. The peak anticoagulant activity was raised to 54' 30". The same quantity of n-propyl sulfone promoted heparin absorption with the blood clotting time raised to an average of only 24' approximately. Two hundred mg. behenyl alcohol also sustained therapeutically effective level of blood heparin for approximately 5 hours. in contrast to 2 hours when n-propyl sulfone alone was used. The prolonged maintenance was associated but not coupled to increased anticoagulant activity. This is evident from the data in Table X. If the volume of n-propl sulfone was increased to 2.0 ml. and the amounts of heparin and behenyl alcohol kept constant (rabbits 108, 109), in the inpecta, the blood clotting time was raised to about 315' and 162' respectively, yet the maintenance of therapeutically effective level of blood heparin was maintained for only 3 hours. A comparison of the data (rabbits 108, 109 compared to rabbits 110–113) would indicate that prolonged maintenance was not necessarily a consequence of increased anticoagulant activity. The emulsions administered to rabbits 110–113 were more viscous than the emulsions administered to rabbits 108 and 109.

(11) HeparinX-n-propyl sulfone-oleyl alcohol

The rabbits' responses, in terms of blood clotting time, after intra-jejunum administration of heparin, n-propyl sulfone and oleyl alcohol, are recorded in Table XI.

Oleyl alcohol, in common with the saturated alcohols ($C_{18}$, $C_{20}$ and $C_{22}$) also enhanced the adjuvant action of n-propyl sulfone. Compared to the data for n-propyl sulfone-heparin alone, it is observed that oleyl alcohol added to heparin and n-propyl sulfone increased the blood clotting time to approximately 130'. The maintenance of therapeutically effective level of blood heparin was also further improved to approximately 4½ hours.

TABLE XI.—SYSTEMIC ANTICOAGULANT ACTIVITY AFTER INTRA-JEJUNUM ADMINISTRATION OF HEPARIN, n-PROPYL SULFONE AND OLEYL ALCOHOL

| Rabbit No. | Injecta | | | Clotting Time Hours After Injection | | | | |
|---|---|---|---|---|---|---|---|---|
| | Heparin*, mg. | Oleyl Alcohol, ml. | n-Propyl Sulfone, ml. | 0** | 1 | 5 | 1 | 19 |
| 114 | 100 | 0.5 | 1.0 | 8'45"±43" | Q140' | | | 8'38" |
| 115 | 100 | 0.5 | 1.0 | 8'45"±43" | 12'45" | ¹130' | | |

¹ Approximate.
*Heparin, 155 U.S.P. anticoagulant.
**Mean and S.D. of 20 rabbits.

(12) Sulfolane heparin-behenyl alcohol

The responses on administration of heparin, sulfolane and behenyl alcohol are shown in the following table:

TABLE XII.—SYSTEMIC ANTICOAGULANT ACTIVITY AFTER ADMINISTRATION OF HEPARIN, SULFOLANE AND BEHENYL ALCOHOL TO THE INTACT INTESTINE

| Rabbit No. | Injecta* | | | Clotting Time Hours after Injection | | | | | |
|---|---|---|---|---|---|---|---|---|---|
| | Heparin, mg. | Sulfolane, ml. | Behenyl Alcohol, mg. | **0 | 1 | 2 | 2½ | 4 | 6 |
| 116 | 100 | 3.0 | | 8'45"±43" | 25'00" | | 13'40" | | |
| 117 | 100 | 3.0 | | 8'45"±43" | 28'00" | | 21'12" | | |
| 118 | 100 | 3.0 | | 8'45"±43" | 29'36" | | | | |
| 119 | 100 | 3.0 | 500 | 8'45"±43" | | 102' | | 31'05" | 10'35" |

*Heparin, 151 U.S.P. anticoagulant μ/mg.
**Mean and S.D. of 20 rabbits.

From the data in Table XII it will be seen that heparin and sulfolane alone provided a therapeutic level of heparin after one hour and that this was maintained for about 1-½ hours. Addition of behenyl alcohol greatly enhanced the blood clotting time, giving an approximate eleven-fold increase after two hours and therapeutic levels were maintained for at least three hours.

(13) n-Propyl sulfone-heparin derivative-arachidyl alcohol

The response on administration of partially methylated and desulfated heparin, with n-propyl sulfone and arachidyl alcohol is shown in the following table.

TABLE XIII.—SYSTEMIC ANTICOAGULANT ACTIVITY AFTER ADMINISTRATION OF A HEPARIN DERIVATIVE, n-PROPYL SULFONE AND ARACHIDYL ALCOHOL TO THE INTACT INTESTINE

| Rabbit No. | Injecta* | | | Clotting Time Hours after Injection | | | |
|---|---|---|---|---|---|---|---|
| | Heparin Derivative, mg. | n-Propyl Sulfone, ml. | Arachidyl Alcohol, mg. | **0 | 3½ | 6 | 23½ |
| 120 | 200 | 1.0 | 200 | 8'45"±43" | 12'20" | 12'25" | 13'30" |

*Heparin Derivative, Partially methylated and desulfated heparin assaying at 70 U.S.P. anticoagulant μ/mg.
**Mean and S.D. of 20 rabbits.

It will be seen from Table XIII that the blood clotting time was substantially increased after 3½ hours and was still increasing after 23½ hours.

In each of the foregoing experiments 8–13, the heparin was dissolved in 0.5 ml. of water which served as a diluent to provide a more fluid composition and facilitate injection into the tract of the experimental animals. The heparin solution was incorporated with the selected sulfone in the manner set forth in Examples VII and VIII.

(14) Intestinal absorption of encapsulated heparin-sulfone-oral administration versus intra-jejunum injection in the dog Two enteric-coated gelatin capsules, each containing 100 mg. sodium heparin in 1.0 ml. of di-n-propyl sulfone were fed simultaneously to a female dog (weight 11 kg.), which had been fasted overnight. Blood samples were taken by venepuncture at intervals after feeding and the respective clotting times were determined.

After a 4-day recovery period, an intra-jejunum injection of an equal amount of sodium heparin and di-n-propyl sulfone as was contained in the two capsules was administered to the same dog and blood samples were taken at intervals and clotting times determined. The results are given in the following Table XIV.

TABLE XIV.—SYSTEMIC ANTICOAGULANT ACTIVITY OF HEPARIN-SULFONE IN DOG-ORALLY VS. INTRA-JEJUNAL INJECTION

| | Clotting Times Hours after Administration | | | | | | |
|---|---|---|---|---|---|---|---|
| | 0 | 1 | 2 | 2½ | 3 | 3½ | 4½ | 5 |
| Oral | 5¾ | | | 10 | | 11 | 7 | 6 |
| Intra-jejunal | 5¾ | 11½ | 10 | | 5¾ | | | |

Systemic anticoagulant activity, at approximately therapeutic level appeared after about 2½ hours on oral administration in capsule form as contrasted to 1 hour upon intra-jejunal injection. In each instance approximately this level of activity was maintained for about one hour before dropping off to normal. This experiment indicates that approximately the same level of therapeutic activity is to be expected whether the composition is introduced into the intestine orally in the form of enteric-coated capsules or directly into the jejunum by injection, substantially the only dieffrence being in the time lag required for the capsules to reach the intestine.

It is to be understood that various changes may be made in the proportions of the ingredients in the composition without departing from the spirit and scope of the invention.

I claim:

1. A therapeutic composition from which heparin anticoagulant substance is absorbable through mucous membranes comprising an effective anticoagulant dosage amount of a readily water soluble form of heparin in combination with at least one non-toxic, physiologically-acceptable sulfone having the formula $R_1R_2SO_2$ where $R_1$ and $R_2$ are alkyl, alkenyl or aralkyl of up to 12 carbon atoms, or together with the sulfur atom form a ring having four ring carbon atoms, said sulfone being present in an amount effective to enhance the absorption of the heparin anticoagulant substance through the mucous membranes.

2. The composition of claim 1 wherein there is included a fatty alcohol of chain length $C_{14}$ to $C_{24}$ in an amount effective to regulate the time period of absorption of the heparin anticoagulant substance from the composition.

3. The composition of claim 1 wherein the sulfone is selected from the group consisting of diethyl sulfone, di-n-propyl sulfone, sulfolene, and mixtures thereof.

4. The composition of claim 3 wherein there is clded a fatty alcohol selected from the group consisting of cetyl alcohol, arachidyl alcohol, oleyl alcohol, stearyl alcohol, behenyl alcohol, and mixtures thereof in an amount effective to regulate the time period of absorption of the anticoagulant substance from the composition.

5. A therapeutic composition in enteric-coated oral pharmaceutical capsule form containing an effective anticoagulant dosage of a water soluble form of heparin in combination with an amount of a non-toxic physiologically-acceptable, sulfone selected from the group consisiting of diethyl sulfone, di-n-propyl sulfone, sulfolene, sulfolane and mixtures thereof, effective to enhance the absorption of heparin anticoagulant substance through the mucous membranes.

6. The composition of claim 5 wherein there is included a fatty alcohol selected from the group consisting of cetyl, alcohol, arachidyl alcohol, oleyl alcohol, stearyl alcohol, behenyl alcohol and mixtures thereof in an amount effective to regulate the time period of absorption of the heparin anticoagulant substance from the composition.

7. The composition of claim 5 wherein the anticoagulant is heparin and the sulfone is diethyl sulfone.

8. The composition of claim 5 wherein the anticoagulant is heparin and the sulfone is di-n-propyl sulfone.

9. The composition of claim 5 wherein the anticoagulant is heparin and the sulfone is sulfolane.

10. The composition of claim 5 wherein the anticoagulant is heparin and the sulfone is sulfolene.

11. The composition of claim 6 wherein the sulfone is di-n-propyl sulfone and the alcohol is oleyl alcohol.

12. A method for the administration of heparin to mammalian animals comprising orally administering at least one enteric-coated capsule containing an effective anticoagulant dosage of a water soluble form of heparin in combination with an amount of a non-toxic, physiologically-acceptable sulfone selected from the group consisting of diethyl sulfone, di-n-propyl sulfone, sulfolane and sulfolene sufficient to cause effective absorption of anticoagulant activity through the mucous membranes into the blood stream.

13. The method of claim 12 wherein the orally effective anticoagulant dosage also contains a fatty alcohol selected from the group consisting of cetyl alcohol, arachidyl alcohol, oleyl alcohol, stearyl alcohol, behenyl alcohol and mixtures thereof in an amount effective to regulate the time period of absorption of the anticoagulant substance from the composition.

14. The method of claim 13 wherein the sulfone is di-n-propyl sulfone and the fatty alcohol is oleyl alcohol.

15. A therapeutic composition comprising an effective anticoagulant dosage amount of heparin sodium in combination with at least one non-toxic, physiologically acceptable sulfone having the formula $R_1R_2SO_2$ where $R_1$ and $R_2$ are alkyl, alkenyl or aralkyl of up to 12 carbon atoms or together with the sulphur atom form a ring having four ring carbon atoms, said sulfone being present in an amount effective to enhance the absorption of the heparin anticoagulant substance through the mucous membranes.

16. A therapeutic composition in enteric coated oral pharmaceutical capsule form containing an effective anticoagulant dosage of heparin sodium in combination with an amount of a nontoxic, physiologically acceptable sulfone selected from the group consisting of diethyl sulfone, di-n-propyl sulfone, sulfolene, sulfolane and the mixtures thereof, effective to enhance the absorption of the heparin anticoagulant substance through the mucous membranes.

17. The composition of claim 16 wherein there is included a fatty alcohol of chain length $C_{14}$ to $C_{24}$ in an amount effective to regulate the time period of absorption of the heparin anticoagulant substance from the composition.

18. The composition of claim 16 wherein there is included a fatty alcohol selected from the group consisting of cetyl alcohol, arachidyl alcohol, oleyl alcohol, stearyl alcohol, behenyl alcohol and mixtures thereof in an amount effective to regulate the time period of absorption of the heparin anticoagulant substance from the composition.

19. The composition of claim 16 wherein the sulfone is diethyl sulfone.

20. The composition of claim 16 wherein the sulfone is di-n-propyl sulfone.

21. The composition of claim 16 wherein the sulfone is sulfolane.

22. The composition of claim 16 wherein the sulfone is sulfolene.

23. The composition of claim 16 wherein the sulfone is di-n-propyl sulfone and the alcohol is oleyl alcohol.

24. A method for the administration of heparin to mammalian animals comprising orally administering at least one enteric coated capsule containing an effective anticoagulant dosage of heparin sodium in combination with an amount of a nontoxic, physiologically-acceptable sulfone selected from the group consisting of diethyl sulfone, di-n-propyl sulfone, di-n-propyl sulfone, sulfolane and sulfolene sufficient to cause effective absorption of anticoagulant activity from the heparin sodium through the mucous membranes into the blood stream.

25. The method of claim 24 wherein the orally effective anticoagulant dosage also contains a fatty alcohol selected from the group consisting of cetyl alcohol, arachidyl alcohol, oleyl alcohol, stearyl alcohol, behenyl alcohol and mixtures thereof in an amount effective to regulate the time period of absorption of the anticoagulant substance from the composition.

26. The method of claim 25 wherein the sulfone is di-n-propyl sulfone and the fatty alcohol is oleyl alcohol.

References Cited

UNITED STATES PATENTS

| | | | |
|---|---|---|---|
| 2,656,298 | 10/1953 | Loewe | 424—183 XR |
| 2,805,977 | 9/1957 | Robinson et al. | 424—19 |
| 2,875,130 | 2/1959 | Grass et al. | 424—19 |
| 3,088,868 | 5/1963 | Windsor | 424—183 XR |
| 3,098,793 | 7/1963 | Loev | 424—115 |
| 3,126,320 | 3/1964 | Morii et al. | 424—183 XR |
| 3,146,167 | 8/1964 | Lantz et al. | 424—19 |
| 3,181,996 | 5/1965 | Bianchini | 424—183 |
| 3,232,833 | 2/1966 | Riviere | 424—183 |

OTHER REFERENCES

Windsor et al., Amer. J. Medicine 37:408–416, September 1964, "In Investigation of Routes of Administration of Heparin Other Than Injection."

S. K. ROSE, Primary Examiner